United States Patent [19]
Watanabe et al.

[11] Patent Number: 5,556,651
[45] Date of Patent: Sep. 17, 1996

[54] INJECTION MOLDING METAL MOLD

[75] Inventors: Seiichi Watanabe; Morio Fujiwara, both of Kanagawa, Japan

[73] Assignee: Fuji Photo Film Co., Ltd., Kanagawa, Japan

[21] Appl. No.: 421,266

[22] Filed: Apr. 13, 1995

[30] Foreign Application Priority Data

Apr. 20, 1994 [JP] Japan ................... 6-104400

[51] Int. Cl.⁶ .................................................. B29C 45/44
[52] U.S. Cl. ................. 425/556; 264/318; 264/334; 425/564; 425/577; 425/DIG. 58
[58] Field of Search ................... 425/556, 577, 425/DIG. 58, 564; 264/318, 334

[56] References Cited

U.S. PATENT DOCUMENTS

| | | | |
|---|---|---|---|
| 4,698,714 | 10/1987 | Sugawara et al. | 360/133 |
| 4,990,077 | 2/1991 | Morita | 425/130 |
| 5,389,329 | 2/1995 | Watanabe et al. | 425/DIG. 58 |

FOREIGN PATENT DOCUMENTS

| | | | |
|---|---|---|---|
| A10590569 | 4/1994 | European Pat. Off. | B29C 45/33 |
| 2124539 | 2/1982 | United Kingdom | B29D 17/00 |
| 2199280 | 7/1988 | United Kingdom | B29C 45/56 |
| 8601179 | 2/1986 | WIPO | B65D 41/34 |
| 8805376 | 7/1988 | WIPO | B29C 45/26 |

*Primary Examiner*—Tim Heitbrink
*Attorney, Agent, or Firm*—Sughrue, Mion, Zinn, Macpeak & Seas

[57] ABSTRACT

An injection molded metal mold is provided to eliminate defects such as appearance defects of molded products, functional defects of products, or the like, caused by formation of a concave portion in a surface opposite to a gate as a metal mold is used over a long period of time. An injection molding metal mold 1 in which when a melted resin is injected first from a gate into an injection cavity, the rate of resin at the gate is not less than 5 m/sec, and the distance between the gate 5 and a portion opposite to the gate is 0.2 mm to 2.0 mm. In the mold, an exchangeable gate-opposition metal mold member, in the form of an ejection pin, is buried in the portion opposite to the gate. Further an injection molding method using this metal mold is provided. The forward end of an ejection pin bites into a plastic molded product so that the molded product is held ejected when the metal mold is opened. The molded product is ejected by the ejection pin provided oppositely to the injection gate and projecting into an injection cavity after molten resin is injected into the injection cavity.

8 Claims, 6 Drawing Sheets

5,556,651

INJECTION MOLDING METAL MOLD

BACKGROUND OF THE INVENTION

1. Field of the Invention

The present invention relates to an injection molding metal mold and an injection molding method using a thermoplastic synthetic resin. The invention particularly relates to an injection molding metal mold and an injection molding method by which a defective projection can be prevented from being produced in a gate-opposition surface of a molded product.

2. Related Art

Conventionally, molded products manufactured by injection molding have been widely used in various fields because the productivity thereof is generally high. Recently, the accuracy of injection molding has become so high that injection molded products have begun to be used in fields where injection molded products were not previously used.

One example of this is a plastic shutter for use in a magnetic disk cartridge. In such a shutter, a projection projecting near a base portion of the shutter can be guided in guide grooves formed along side edge portions of outer surfaces of upper and lower half-shells so as to open and close an opening for inserting a magnetic head. Conventionally, in almost all cases, a metal shutter formed of a metal plate such as thin stainless steel plate, or the like, and bent into a U-shape was used as such a shutter. Recently, however, a plastic shutter has often been used instead of a metal shutter because it can be manufactured easily and inexpensively.

A valve gate for mechanically closing a gate is effective in a thin molded product such as the afore-mentioned shutter. That is, in addition to shortening the molding cycle, high-speed filling-up of resin, fast gate sealing, and so on, there is not only an extremely infrequent occurrence of gate defects in appearance such as gate stringiness, gate residue or the like, but also there is an extremely small possibility of gate jam caused by contaminants in injected resin.

By using such a valve gate, it is possible to enlarge the gate diameter, so as to improve the flow of resin in the gate portion, for example, as disclosed in Japanese Patent Unexamined Publication No. Sho-2-229019. However, a gate having a large diameter allows a large size of and more amount of contaminants contained in a melted resin to pass through the gate easily, so that the contaminants are also injected into an injection cavity at a high speed. These contaminants collide against a portion of a movable mold opposite to the gate and shave to damage the surface of the metal mold. If the damage is great, it is transferred to the molded product, resulting in a fault in the appearance of the molded product. If this shaving is repeated, the portion of the metal mold portion opposite to the gate is gradually made concave, so that the corresponding portion of the molded product becomes convex. This is an extremely serious problem in the case where an inside sliding surface of the shutter becomes convex.

Not limited to solely the valve gate, the phenomenon wherein the portion opposite to the gate is damaged is apt to occur when a melted resin passes through the gate at a large rate. For a conspicuous example, it is apt to occur when a valve gate or an external heating hot runner using a hot spruce-gate or the other gate is used. In this case, the life of a metal mold is reduced by the formation of a concave portion on a surface of a cavity opposite to a gate. In addition, there has been a problem in that exchanging such a metal mold is expensive.

On the other hand, the following problem has been included in the molding of such a shutter.

This problem will be described with reference to FIGS. 9 and 10. FIGS. 9 and 10 are a perspective and a sectional side view illustrating the state where a metal mold for molding a shutter is opened and the shutter is ejected by ejection pins.

Movable mold 40 having a center core 41 as shown in FIG. 9 is provided with slide cores (not shown) which are provided so as to sandwich the center core 41 therebetween from right and left. For example, the side cores are opened suitably in accordance with the opening movement of the movable mold 40, and a molded shutter 22 is ejected by upper and lower ejection pins 42 (in the arrow A direction). In this state, the shutter 22 loses upper and lower supports (in fact, portions of the slide cores are opposite at a suitable distance), and the shutter 22 is supported only by the center core 41, so that the shutter 22 is inclined as shown by the arrow D. A degassing portion (not shown) is formed in a corner portion where the slide cores meet each other, and stains due to gas deposited to this portion. Therefore, at least a part of the stains may transfer and adhere to the shutter 22 because of the inclination of the shutter as mentioned above, or in the worst case, the shutter 22 may fall off. Since this ejected shutter 22 is usually caught by a shutter holding means (not shown), and moved to the next process step, such inclination or falling-off of the shutter becomes a serious problem.

The structure of the gate or the structure of degassing is disclosed, for example, in U.S. Pat. No. 4,990,077. The structure of a metal mold shown therein is a structure where a pin for degassing is provided at a place opposite to a gate, but it has no relation to and cannot solve the problem of damage to a gate-opposition surface and the problem when a molded product is ejected to be taken out and transferred to the next process step.

SUMMARY OF THE INVENTION

An object of the present invention is to eliminate the problems such as appearance defects of molded products, function defects of products, and so on, caused by the formation of a concave portion in a mold surface opposite to a gate when using a metal mold for a long term. Another object of the invention is to provide an injection molding metal mold and an injection molding method in which a plastic shutter can be prevented from falling-off when the plastic shutter is ejected by an ejection pin, and in which the shutter can be taken out stably.

According to the present invention, an injection molding metal mold is provided, comprising: a fixed mold; a movable mold, disposed opposite said fixed mold, being movable in a direction towards and away from said fixed mold; an injection cavity, disposed between said fixed mold and said movable mold, into which a melted resin is injected; at least one injection gate, disposed in one of said fixed mold and said movable mold, through which the melted resin is injected into said injection cavity; and an exchangeable member, buried in one of said fixed mold and said movable mold directly opposite said injection gate. The inventive injection molding metal mold preferably has a distance between said injection gate and said exchangeable member is 0.2 to 2.0 mm, and possesses a rate at which the melted resin is injected of not less than 5 m/sec, at the gate position with the preferred range from 10 m/sec to 30 m/sec. A forward end surface of the exchangeable member, opposite said injection gate, may be inclined so that a substantially central portion of said forward end surface is closest to said gate.

An injection molding method for molding a thin plastic product is also provided. The method comprises the steps of: injecting a melted resin via an injection gate into an injection cavity of a mold including a fixed mold and a movable mold, the injection cavity being disposed between the fixed mold and the movable mold; opening said mold to allow for ejection of the molded thin plastic product; providing an ejection pin in one of the fixed mold and the movable mold opposite said injection gate; and ejecting the thin plastic product by moving the ejection pin towards the plastic product, a forward end of the ejection pin biting into the plastic product so that the plastic product is held by the ejecting pin when said mold is opened.

DETAILED DESCRIPTION OF THE PREFERRED EMBODIMENTS

An embodiment of the present invention shown in FIGS. 1 to 7 will be described below. First, a shutter used in a magnetic disk cartridge which is a molded product to be molded in this embodiment will be described with reference to FIG. 7.

Figure 7:
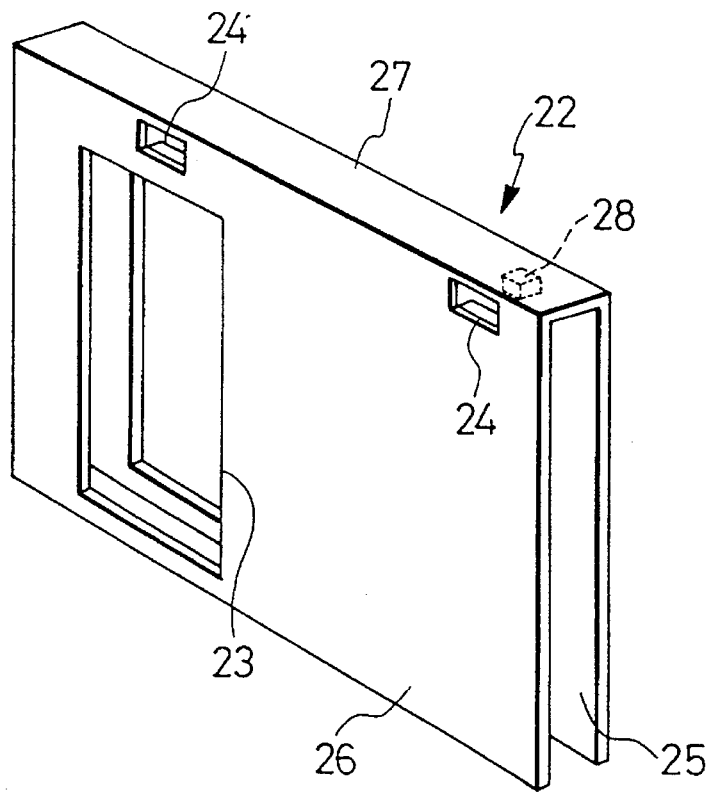
FIG. 7 is a perspective view of a shutter to be mounted in a magnetic disk cartridge.

A shutter 22 shown in FIG. 7 has an substantially U-shaped section, and is constituted by a front plate 25, a back plate 26, and a top plate 27 coupling the front and back plates 25 and 26 to each other. A window portion 23 is provided in the same position of each of the front and back plates 25 and 26, and a projection 24 for engaging with a groove on the cartridge is formed near the top plate in the back plate 26. A spring engagement/stop convex portion 28 is formed on the inner surface of top plate 27. Engagement/stop portion 28 is for engaging with a spring to accelerate the shutter in the shutter-closing direction. The two plates 25 and 26 are designed so that their forward end portions are positioned at a distance shorter than the width of the top plate 27. That is, the distance between the plates 25 and 26 decreases the further away from top plate 27 one goes. The thickness of the shutter 22 is, for example, 300 μm to 500 μm with a preferred range from 300 μm to 400 μm.

As for the material of the shutter 22, resin material the mechanical strength of which is high is preferable. For example, polyoxymethylene resin, or the like, can be used.

Figure 1:
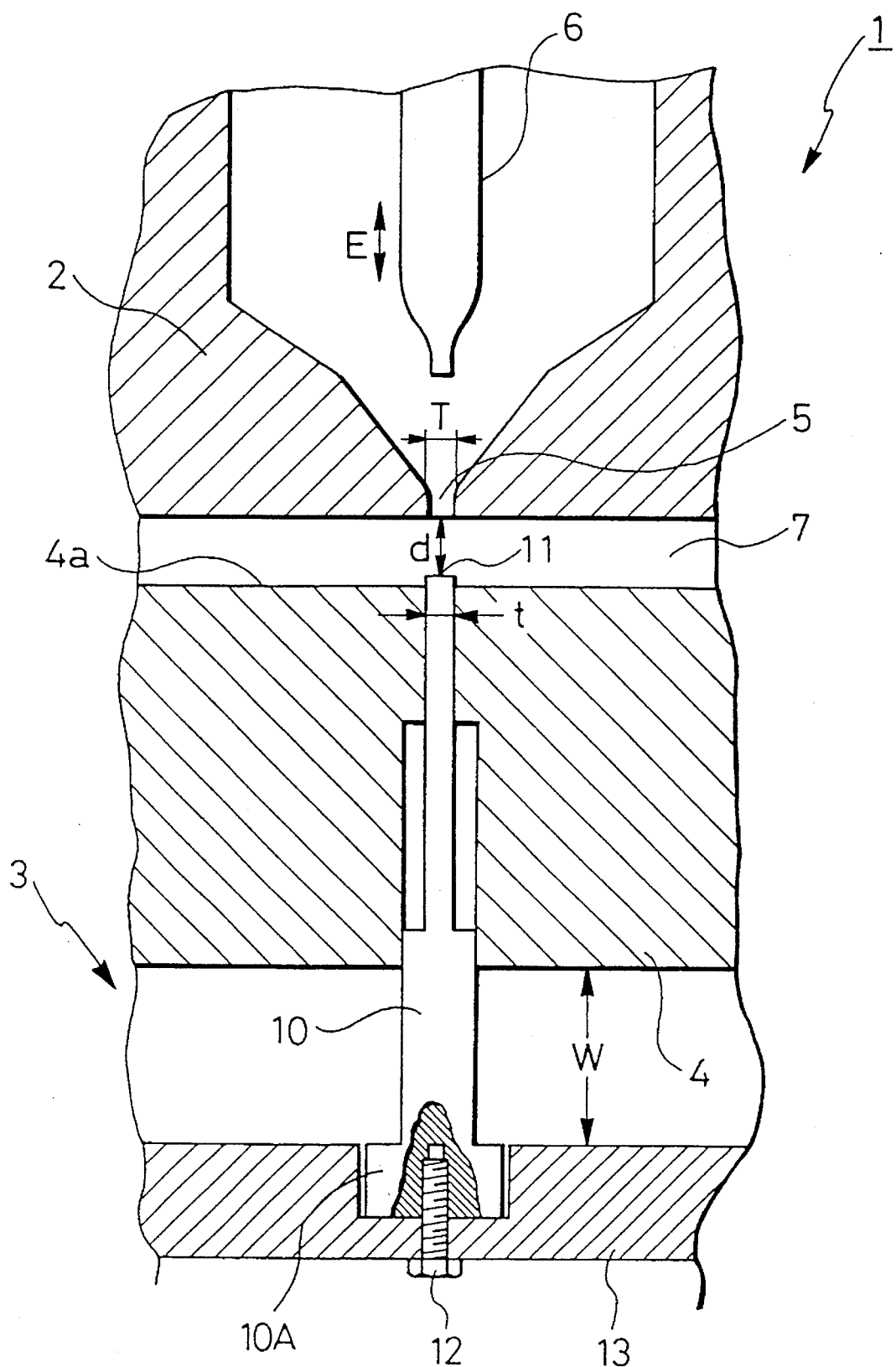
FIG. 1 is an expanded schematic sectional view of a main portion of a molding metal mold of the present invention.
Figure 2:
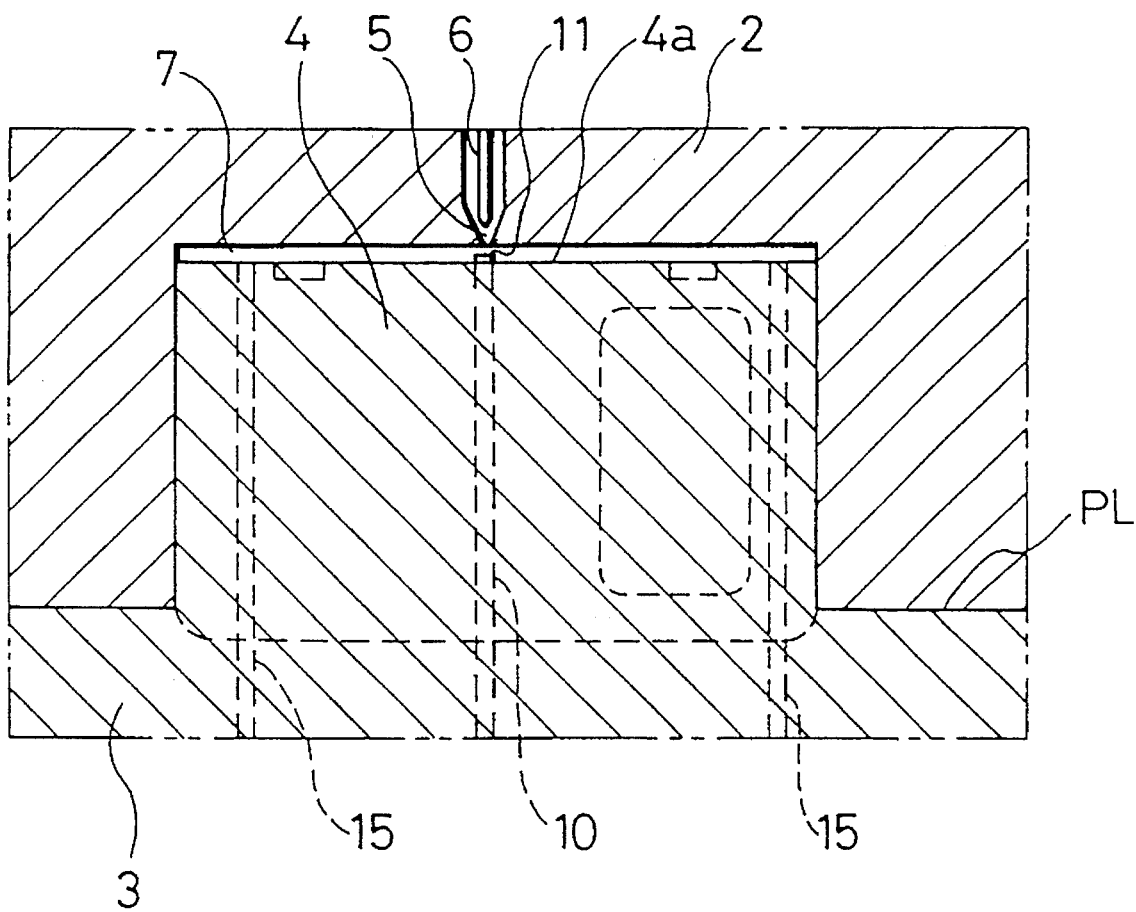
FIG. 2 is a schematic sectional view of a molding metal mold in an embodiment of the present invention.

Briefly, as illustrated in FIGS. 1 and 2, a molding metal mold 1 for molding the shutter 22 includes a fixed mold 2 having a valve gate 5 (hereinafter simply referred to as a "gate"), and a movable mold 3 having a center core 4 and slide cores which are provided on the opposite, right and left sides (in the direction perpendicular to the plane of the paper in FIGS. 1 and 2) of the center core and which are opened or closed in the right and left. These metal mold members are combined to form an injection cavity 7. A center ejection pin 10 and two, right and left ejection pins 15 are provided in the center core 4.

The ejection pin 10 contacting the center of the injection cavity 7, has a forward end surface 11 projecting over an upper end surface 4a of the center core 4. The gate 5 is disposed at a place opposite to the forward end surface 11. Further, the ejection pin 10 is designed so that its diameter is wider at its base portion 10A. The base portion 10A is fitted into a holding member 13, and detachably fixed by a setscrew 12. A gap W is formed between the center core 4 (actually, a metal mold base holding the center core) and the holding member 13 so as to enable the ejection pin 10 to perform ejection when the plastic shutter is taken out from the mold.

A needle pin 6 of the gate 5 can be moved up and down (in the arrow E direction) by a driving means (not shown) to open and close the gate so as to control the flow of injected melted resin into the injection cavity 7.

According to the extensive study by the present inventors, if the diameter t of the ejection pin 10 is designed to satisfy the following expression when the injection speed of the melted resin at the gate portion is not less than 5 m/s, and when the distance d between the gate 5 and the forward end surface 11 of the ejection pin 10 is not more than 2 mm: 0.6×(gate diameter T)≦(pin diameter t), it is not necessary to make the diameter of the ejection pin 10 larger, and it is possible to set the minimum diameter of the ejection pin by which the problem of damage to the metal mold by the injected resin can be solved, which is a preferred embodiment of the invention. That is, since the surface of the metal mold can be prevented from being damaged if the pin diameter of the ejection pin 10 is larger than the diameter of the damage, the above-mentioned expression enables such an effective setting. In this embodiment, for example, the gate diameter of the gate 5 is 0.7 to 2.0 mm, the distance between the gate 5 to the forward end surface 11 of the pin is 0.2 to 2.0 mm, and the diameter of the ejection pin 10 is 0.3 to 6.0 mm. As for the material of the ejection pin, it is a matter of course that a material having high hardness is preferable, and for example, SKD11 (hardness $H_RC60$), sintered hard alloy, or the like, may be used. Even if the hardness of the material of the ejection pin 10 itself is not so high, a hard coat such as TiN, or the like, may be given thereto.

As for the injected resin, for example, polyoxymethylene (the melt flow index MI of which is about 50) may be used.

Figure 11A:
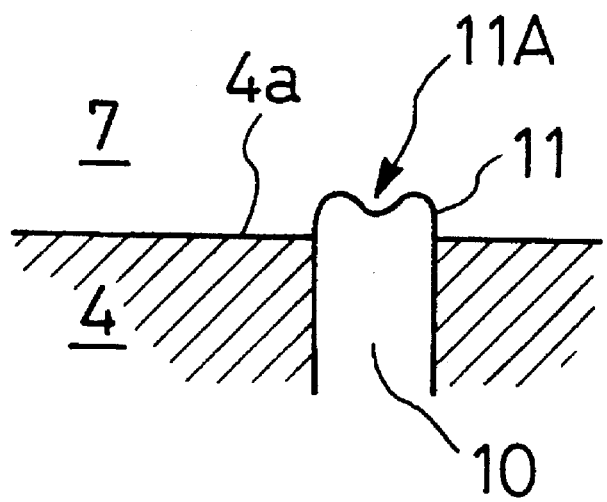
FIG. 11A is a schematic sectional view of a center core and an ejection pin of a molding metal mold.
Figure 11B:
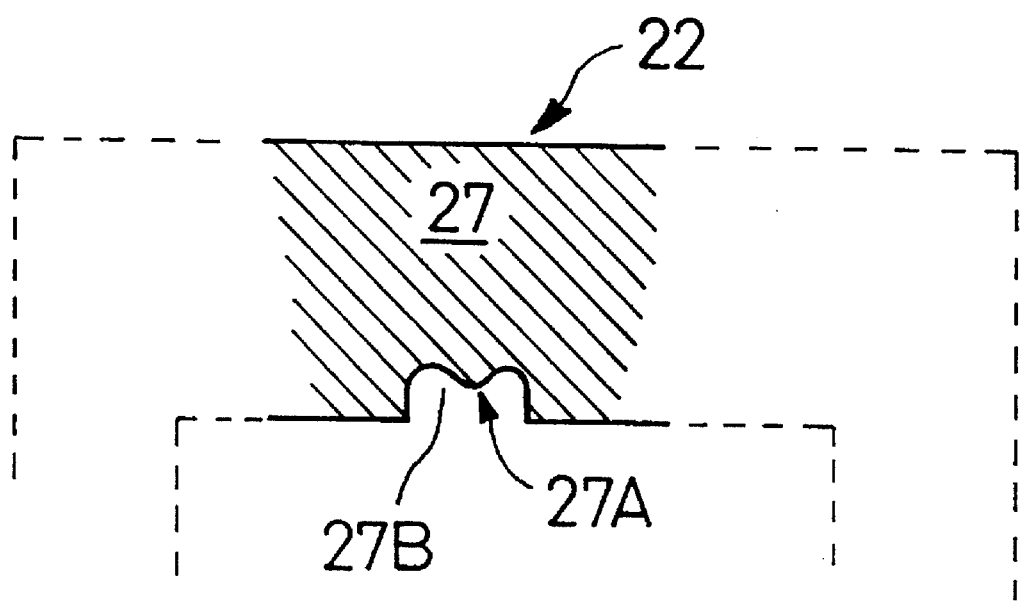
FIG. 11B is a schematic sectional view of the plastic shutter molded by the metal mold shown in FIG. 11A.

In this embodiment, the portion opposite to the gate 5 is the ejection pin 10 projecting over any other wall as mentioned above. According to the invention, even though the forward end surface 11 of the ejection pin 10 is shaved by the melted resin injected from the gate at high speed and the concave portion (hereinafter referred to shaving concave) 11A is formed on the forward end surface 11 as shown in FIG. 11A, since the ejecting pin 10 itself protrudes in the injection cavity 7 as shown in FIG. 1, the corresponding convex portion 27A of the molded product such as the top plate 27 of the plastic shutter 22 is formed in a concave 27B corresponding to the projected portion of the ejection pin 10 as shown in FIG. 11B. Accordingly, if the height of the convex portion 27A is smaller than the depth of the concave 27B, there is no protrusion on the surface of the top plate 27 of the plastic shutter 22 as shown in FIG. 11B considering the shutter as a whole product. For the reason discussed above, it is not necessary to replace the ejection pin 10 until the height of the convex portion 27A of the shutter exceeds the depth of the concave 27 thereof, that is, in other words, until the deepest point of the shaving concave 11A becomes lower than the upper end surface 4a of the center core 4 of the metal mold. Further even if the deepest point of the shaving concave 11A becomes lower than the upper end surface 4a of the center core 4, only the ejection pin 10 should be replaced with a new one while still using the same metal mold itself. The durability of the metal mold can thus be increased. In addition, it was possible to improve the shot number (the number of times of injection) in comparison with a conventional mold on a large scale before the convex portion formed by the shaving is formed so large as to project over the concave portion. Further, since the ejection pin 10 is exchangeable, it is easy to perform maintenance of the metal mold, and it is possible to prolong the life of the metal mold.

In addition, since the forward end tip portion of the ejection pin 10 can bite into a molded product when the molded product is taken out of the metal mold, the shutter 22 can be held by the ejection pin 10 so that it is possible to improve the ejection of the molded product.

Figure 3:
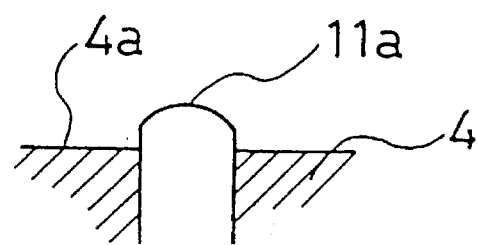
FIG. 3 is a schematic side view illustrating the shape of a forward end portion of an ejection pin.
Figure 4:
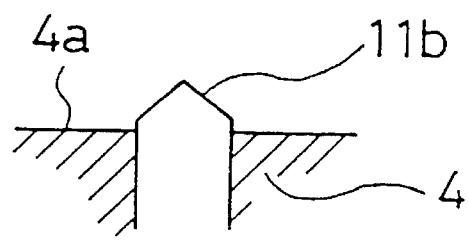
FIG. 4 is a schematic side view illustrating the shape of a forward end portion of an ejection pin.
Figure 5:
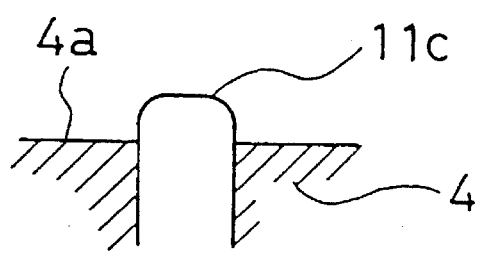
FIG. 5 is a schematic side view illustrating the shape of a forward end portion of an ejection pin.
Figure 6:
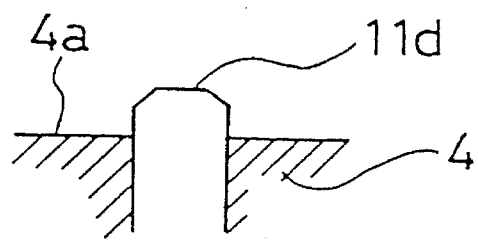
FIG. 6 is a schematic side view illustrating the shape of a forward end portion of an ejection pin.

The shape of the forward end surface 11 of the ejection pin 10 in the present invention is not limited to a flat structure as shown in FIG. 1, and it is possible to make the shape into a semi-spherical forward end surface 11a as shown in FIG. 3 or a conical or triangular-section forward end surface 11b as shown in FIG. 4. If the forward end surface 11 has such a curved or inclined shape, the resistance of injected resin can be spread radially, and there is also an effect of buffer function against a shock of the injected resin. In addition, each corner portion of the forward end portion may be chamfered into an R-shape as shown in FIG. 5 or into a slope-shape as shown in FIG. 6.

The amount of projection of the forward end surface 11 projecting from the upper end surface 4a at a position thereof which is the closest to the gate is set within a range from 0.005 mm to 0.1 mm and, more preferably, within a range from 0.01 mm to 0.06 mm, under a condition where the distance between the injection gate and the forward end surface is within a range from 0.2 to 2 mm.

As has been described above, the present invention provides a metal mold in which an ejection pin is provided contacting with at least the center of a connection portion of a plastic molded product, the ejection pin is made to project over the wall of the above-mentioned injection cavity, and an injection gate is provided opposite to the forward end surface of the ejection pin. The present invention also provides a molding method using the metal mold mentioned above.

Therefore, with the structure of the ejection pin in which the portion opposite to the gate projects over the upper surface of the movable mold, even if the forward end surface of the ejection pin is shaved by resin injected from the gate, the corresponding convex portion of the molded product is formed in a concave corresponding to the projected portion of the ejection pin, so that there is no case where the convex portion projects over any other wall. Accordingly, it is possible to avoid the trouble which would occur when the convex portion projects over the other walls, and it is possible to manufacture molded products stably with high quality. In addition, since the ejection pin is exchangeable, it is easy to perform maintenance of the metal mold, it is possible to prolong the life time of the metal mold, and it is possible to reduce the cost of manufacture of the products. In addition, the forward end portion of the ejection pin can bite into a molded product when the molded product is taken out of the metal mold, so that the molded product can be held by this ejection pin, and it is possible to improve the property of ejection of the molded product.

In the above description, the "exchangeable member" which is buried in one of the fixed mold and the movable mold directly opposite the injection gate is the ejection pin. However, the present invention is not limited thereto or thereby. For example, the invention can be applied to another arrangement in which a cylindrical concave part is formed on a portion in the metal mold cavity opposite to the injection gate which collides with the injected molded resin, a thread groove is formed on a side wall of the cylindrical concave, and a cylindrical member serving as an exchangeable member is screwed into the thread groove.

EXAMPLES

The effects of the present invention can be made clear by the following examples.

Example 1

A test was performed by repeating the injection molding of the shutter 22 by use of an injection molding metal mold having a structure shown in FIGS. 1 and 2.

Figure 8:
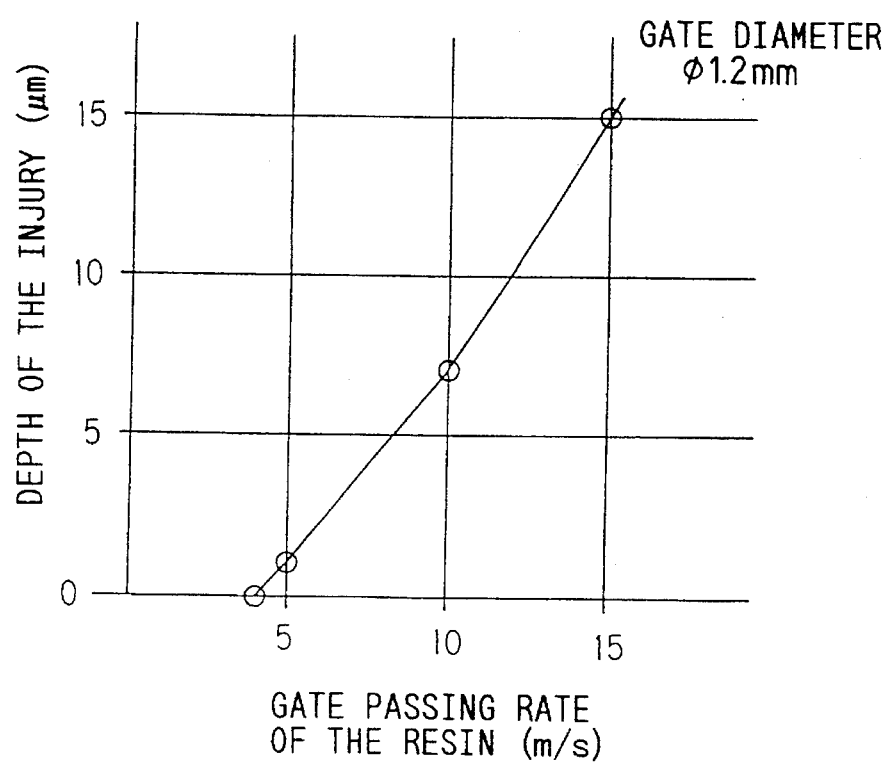
FIG. 8 is a graph illustrating the relationship between the gate passing rate of a melted resin and the depth of damage.
Figure 9:
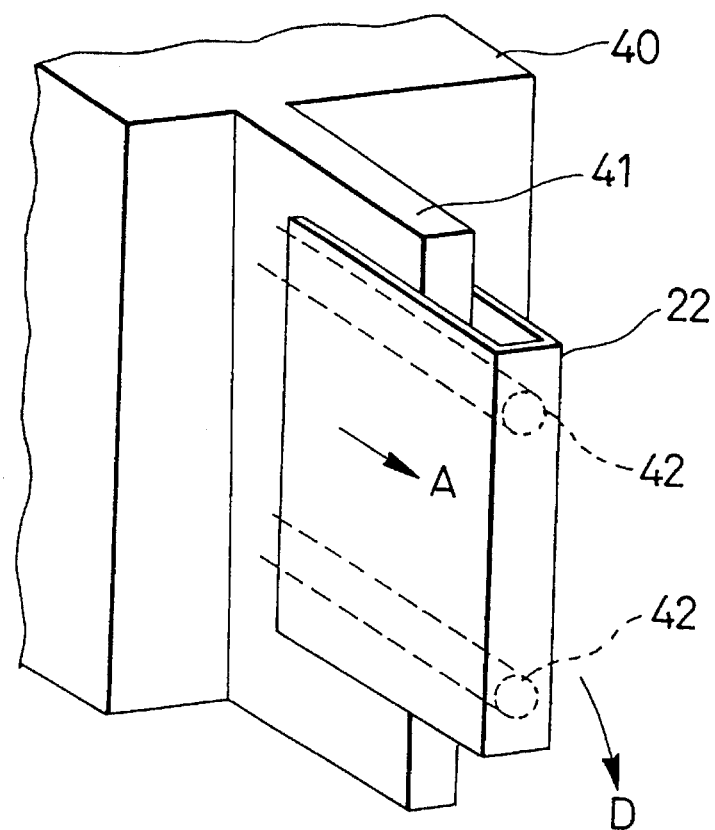
FIG. 9 is a perspective view illustrating the state when a molded shutter is extracted from a conventional molding metal mold.
Figure 10:
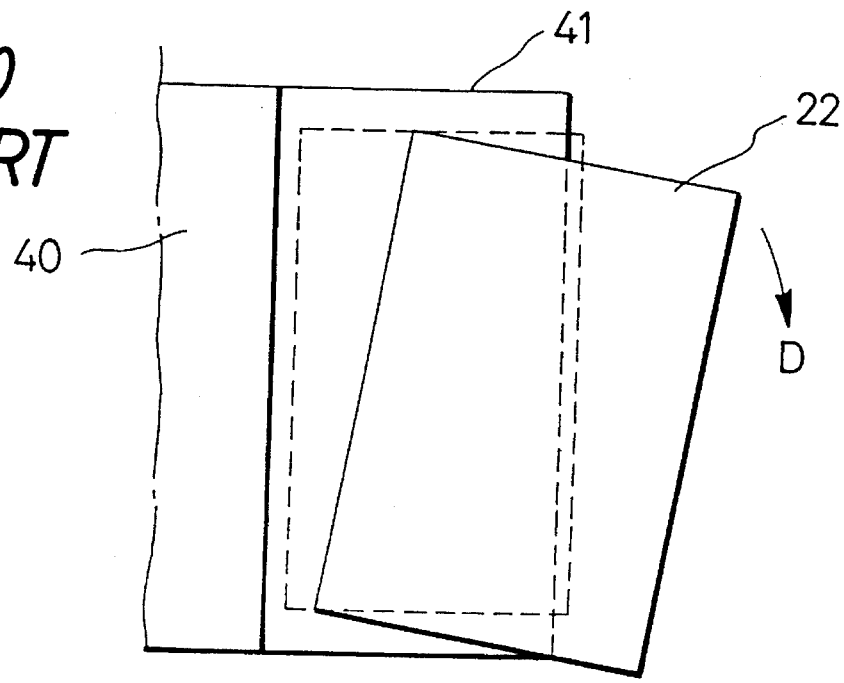
FIG. 10 is a schematic side view illustrating the state when a molded shutter is extracted from a conventional molding metal mold.

The sizes of the molding metal mold in the vicinity of the gate thereof and the other conditions were as follows.

gate diameter: $\phi$1.2 mm or $\phi$1.0 mm quantity of projection of the ejection pin: 0.03 mm distance between the gate and the pin forward end surface: 0.47 mm pin diameter: $\phi$0.8 mm material of the ejection pin: SKD11 (hardness $H_R$C60)

resin: poly oxymethylene melt flow index (MI)=50 member of times of injection number: 100 thousand shots size of the filter for filtrating the resin can filtrate foreign substances: 0.7 mm Under the above conditions, the gate passing rate of the melted resin and the depth and size (diameter) of damage estimating the state of damage were measured. This result is shown in FIG. 8. It is understood from FIG. 8 that the depth of the damage which appears conspicuously when the gate passing rate of the injected resin is not less than 5 m/s.

Example 2

In order to inquire into the relationship among the distance d, the pin diameter t and the gate diameter T, the state of formed damage was tested while changing those sizes. The maximum value of the pin diameter t was 2.7 mm in view of the configuration of a shutter, and the maximum value of the distance d was 0.5 mm in view of the thickness of a top plate. The other conditions were set to correspond to those in Example 1. This result is shown in Table 1.

TABLE 1

| gate diameter T (mm) | distance d from gate (mm) | damage diameter (mm) |
|---|---|---|
| 0.7 | 0.2 | 0.2 |
| 0.7 | 0.5 | 0.3 |
| 1.0 | 0.2 | 0.3 |
| 1.0 | 0.5 | 0.4 |
| 2.0 | 0.2 | 0.6 |
| 2.0 | 0.5 | 0.9 |

From Table 1, when the gate diameter and the pin diameter satisfied the relationship $0.6 \times$(gate diameter T)$\leq$(pin diameter t), damage could be always produced in the forward end surface of the pin, and damage was not formed at any place other than a concave formed by the forward end portion of the pin. In addition, the shutters were not inclined or did not fall when they were taken out of the metal mold. The allowable maximum diameter of the pin can be set up to the maximum width of a connection portion of the shutter.

What is claimed is:

1. An injection molding metal mold, comprising:
   a fixed mold;
   a movable mold, disposed opposite said fixed mold, being movable in a direction towards and away from said fixed mold;
   an injection cavity, disposed between said fixed mold and said movable mold, into which a melted resin is injected;
   at least one injection gate, disposed in one of said fixed mold and said movable mold, through which the resin is injected into said injection cavity, said injection gate having a gate diameter of 0.7 to 2.0 mm; and
   a readily replaceable member, buried in one of said fixed mold and said movable mold directly opposite said injection gate, wherein a distance between said injection gate and said replaceable member is within a range from 0.2 to 2.0 mm, and a width of said replaceable member is designated to satisfy the following expression:

$$0.6 \times (\text{gate diameter T}) \leq (\text{replaceable member width t}).$$

2. An injection molding metal mold according to claim 1, wherein a rate at which the resin is injected at the gate is not less than 5 m/sec.

3. An injection molding metal mold according to claim 1, wherein a forward end surface of said replaceable member, opposite said injection gate, is inclined so that a substantially central portion of said forward end surface is closest to said gate.

4. An injection molding metal mold according to claim 1, wherein said replaceable member comprises an ejection pin.

5. An injection molding metal mold according to claim 4, wherein when the injection speed of the melted resin at said gate is not less than 5 m/s, and when a distance between said gate and a forward end surface of said ejection pin is not more than 2 mm, a diameter of said ejection pin is designed to satisfy the following expression:

$$0.6 \times (\text{gate diameter T}) \leq (\text{pin diameter t}).$$

6. An injection molding metal mold according to claim 4, wherein the distance between said gate to forward end surface of said ejection pin is 0.2 to 2.0 mm, and the diameter of said ejection pin is 0.3 to 6.0 mm.

7. An injection molding metal mold according to claim 3, wherein a rate at which the resin is injected at said gate is not less than 5 m/sec.

8. An injection molding metal mold according to claim 4, wherein a rate at which the resin is injected at said gate is not less than 5 m/sec.

* * * * *